(12) United States Patent
Joseph et al.

(10) Patent No.: US 11,323,360 B2
(45) Date of Patent: May 3, 2022

(54) SEQUENCE NUMBER CHECKSUM FOR LINK STATE PROTOCOLS

(71) Applicant: Juniper Networks, Inc., Sunnyvale, CA (US)

(72) Inventors: William Britto Arimboor Joseph, Bangalore (IN); Shraddha Hegde, Bangalore (IN); Alampoondi Eswaran Natarajan, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/721,698

(22) Filed: Dec. 19, 2019

(65) Prior Publication Data

US 2021/0194798 A1 Jun. 24, 2021

(51) Int. Cl.
*H04L 45/00* (2022.01)
*H04L 1/00* (2006.01)
(Continued)

(52) U.S. Cl.
CPC ............ *H04L 45/32* (2013.01); *H04L 1/0061* (2013.01); *H04L 1/1621* (2013.01); *H04L 45/02* (2013.01);
(Continued)

(58) Field of Classification Search
CPC ......... H04L 45/32; H04L 45/04; H04L 69/40; H04L 69/166; H04L 45/02; H04L 1/0061;
(Continued)

(56) References Cited

U.S. PATENT DOCUMENTS

| 5,128,926 A * | 7/1992 | Perlman ................. H04L 29/00 370/248 |
| 2003/0123457 A1* | 7/2003 | Koppol ................ H04L 45/502 370/400 |

(Continued)

FOREIGN PATENT DOCUMENTS

EP     0447725 A2     9/1991

OTHER PUBLICATIONS

ORAN, "OSI IS-IS Intra-domain Routing Protocol," RFC 1142, Network Working Group, Feb. 1990, 157 pp.
(Continued)

*Primary Examiner* — Ajit Patel
*Assistant Examiner* — Wilfred Thomas
(74) *Attorney, Agent, or Firm* — Shumaker & Sieffert, P.A.

(57) ABSTRACT

In general, various aspects of the techniques described in this disclosure provide a sequence number checksum for link state protocols. In one example, the disclosure describes an apparatus, such as a network device, having a control unit operative to obtain link state information describing links between pairs of the network devices in a network topology, the link state information being fragmented into a plurality of link state protocol (LSP) fragments; compute a sequence number checksum from sequence numbers of the link state protocol (LSP) fragments; receive an LSP data unit from another network device in the network; determine whether a sequence number checksum in the LSP data unit matches a sequence number checksum computed from the link state information; and configure a delay for processing the LSP data unit in response to determining a mismatch between the sequence number checksum of the LSP data unit and the sequence number checksum computed from the link state information.

20 Claims, 6 Drawing Sheets

(51) Int. Cl.
    *H04L 1/16*     (2006.01)
    *H04L 45/02*     (2022.01)
    *H04L 45/12*     (2022.01)
    *H04L 47/34*     (2022.01)
    *H04L 47/36*     (2022.01)
    *H04L 69/08*     (2022.01)
    *H04L 69/166*     (2022.01)
    *H04L 69/322*     (2022.01)
    *H04L 69/40*     (2022.01)

(52) U.S. Cl.
    CPC .............. *H04L 45/04* (2013.01); *H04L 45/12* (2013.01); *H04L 47/34* (2013.01); *H04L 47/36* (2013.01); *H04L 69/08* (2013.01); *H04L 69/166* (2013.01); *H04L 69/322* (2013.01); *H04L 69/40* (2013.01)

(58) Field of Classification Search
    CPC ..... H04L 69/322; H04L 1/1621; H04L 69/08; H04L 47/34; H04L 45/12; H04L 47/36
    See application file for complete search history.

(56) References Cited

U.S. PATENT DOCUMENTS

| | | | |
|---|---|---|---|
| 2003/0233538 A1* | 12/2003 | Dutertre | H04W 12/0433 713/151 |
| 2006/0245372 A1* | 11/2006 | Ou | H04L 45/02 370/254 |
| 2007/0053300 A1* | 3/2007 | Zhu | H04L 45/24 370/238 |
| 2007/0286091 A1* | 12/2007 | Hopps | H04L 45/02 370/252 |
| 2010/0020726 A1* | 1/2010 | Chu | H04L 45/48 370/256 |
| 2013/0145045 A1* | 6/2013 | Eastlake, III | H04L 61/25 709/245 |
| 2016/0269293 A1* | 9/2016 | K A | H04L 45/02 |
| 2019/0104218 A1* | 4/2019 | Kambegawa | H04L 1/1867 |
| 2019/0149421 A1* | 5/2019 | Jin | H04W 36/305 370/331 |
| 2019/0312804 A1* | 10/2019 | Yang | H04L 29/06 |
| 2019/0372889 A1* | 12/2019 | Michael | H04L 45/22 |

OTHER PUBLICATIONS

Harrington et al., "An Architecture for Describing Simple Network Management Protocol (SNMP) Management Frameworks," RFC 3411, Network Working Group, the Internet Engineering Task Force draft, Dec. 2002, 64 pp.

Enns, "NETCONF Configuration Protocol," Network Working Group, RFC 4741, Dec. 2006, 96 pp.

Extended Search Report from counterpart European Application No. 20162664.5, dated Aug. 25, 2020, 12 pp.

Response to Extended Search Report dated Aug. 25, 2020, from counterpart European Application No. 20162664.5 filed Dec. 23, 2021, 27 pp.

* cited by examiner

FIG. 3

| | | |
|---|---|---|
| INTRA DOMAIN ROUTING PROTOCOL DISCRIMINATOR 114A | | |
| PDU HEADER LENGTH 114B | | |
| PDU IDENTIFIER 114C | | |
| ID LENGTH 114D | | |
| SEQUENCE NUMBER 114E | | |
| TYPE 116A | LENGTH 116B | VALUE 116C |
| TYPE 118A | LENGTH 118B | VALUE 118C |
| TYPE 120A | LENGTH 120B | VALUE 120C |
| TYPE 122A | LENGTH 122B | VALUE 122C |
| TYPE 124A | LENGTH 124B | VALUE 124C |
| SNC TYPE 125A | SNC LENGTH 125B | SNC VALUE 125C |

110

112 (brace covering top 5 rows)

126 (brace covering bottom 6 rows)

SEQUENCE NUMBER CHECKSUM FOR LINK STATE PROTOCOLS

TECHNICAL FIELD

The disclosure relates to computer networks and, more particularly, to link state protocols for computer networks.

BACKGROUND

A routing protocol defines a process by which network devices, such as routers, communicate with each other to disseminate information that allows the routers to select routes between any two routers in a computer network. One type of routing protocol, referred to as a link state protocol, allows routers to flood various types of information regarding the various links within the network (where such information may be referred to as "link state information"). In accordance with a link state protocol, the routers may flood link state information related to available interfaces, metrics and/or other variables associated with network links between a router and an adjacent router. The routers may flood the link state information throughout the network, thereby allowing each of the router to construct a respective topology or map of the network. Some examples of link state protocols include the Open Shortest Path First (OSPF) protocol and the Intermediate-System to Intermediate System (IS-IS) protocol, which are Interior Gateway Protocols (IGP).

The connection between two devices on a network is generally referred to as a link. Connections between devices of different autonomous systems are referred to as external links while connections between devices within the same autonomous system are referred to as internal links. Many computer networks, including public networks such as the Internet, may dynamically reroute data packets in the event an individual link fails. Upon failure of a link, the routers may transmit new link-state information to adjacent, neighboring routers, allowing each router to update respective local routing information bases defining a topology of the network. Links can fail for any number of reasons, such as failure of the physical infrastructure (e.g., the link) between the routers, or failure of the routers interfacing with the link.

When a link in the network fails, routers coupled to the failed link may advertise, in accordance with the link state protocol, the failure via link state information, where the link state information may indicate that the link is unavailable. In the context of IS-IS, the router may transmit the link state information as a link state protocol data unit (PDU). As IS-IS operates within the context of a layer two network protocol, the link state protocol data unit may be subjected to maximum transmission units (MTUs) of Ethernet or other layer two networking protocols. As such, the router may fragment the link state protocol data unit into a number of different fragments, which the router may then send individually to adjacent routers in the network.

Routers that receive the fragments may individually process each fragment, updating the topology represented by the routing information bases to reflect the link state information specified in each fragment. However, updating the topology responsive to receiving each fragment may result in so-called "churn" as a result of the fragment containing incomplete link state information regarding various links, where such "churn" may involve a router updating the topology to indicate one or more links as unavailable only to receive a subsequent fragment that includes link state information indicating that the link is available. To avoid churn, the recipient router may be configured to delay processing of individual fragments for some specified time that may allow for subsequent fragments to be received.

SUMMARY

In general, techniques are described by which to enable a network device to potentially minimize delay in processing fragments of link state protocol data units using a sequence number checksum in a manner that may also avoid churn. The sequence number checksum may enable the network device, such as a router, to accurately identify link state protocol data unit (PDU) fragments. As such, the network device receiving the fragments may apply the sequence number checksum to the previously and currently received sequence numbers specified in each of the fragments to determine whether all of the fragments have been received.

When a computed checksum across the previously and currently received sequence numbers of the fragments does not match the received sequence number checksum (specified in the previously and/or currently received fragments), the network device may delay processing of the fragments. When the computed checksum across the previously and currently received sequence numbers set forth in the fragments matches the received sequence number checksum (indicating that all the fragments have been received), the network device may process the fragments and update the routing information database according to the fragments. As such, various aspects of the techniques may accomplish such maintenance by ensuring accurate link state information for each node and thereby mitigate churn while also potentially minimizing delay in processing the fragments, as a preconfigured delay can be avoided for the last fragment of the set of fragments given that the sequence number checksum may positively indicate that all fragments of the set of fragments has been received.

In this way, the techniques may provide one or more technical advantages or improvements that provide at least one practical application. As described herein, the sequence number checksum indicates which link state information was in effect (e.g., which links were available) when a link state protocol data unit fragment was first propagated. By incorporating the sequence number checksum, network devices implementing the techniques described herein may be not susceptible to any of any of the above-mentioned "churns" and furthermore, potentially avoid a preconfigured, and often overly long, delay associated with processing fragments. Therefore, these techniques may improve upon operation of the device and/or network itself and such improvements are technically tied to the functionality of the device and/or network itself.

In one example, a method includes receiving, by a first network device residing in a network, from a second network device adjacent to the first network device in the network, and in accordance with a link state protocol, a fragment representative of at least a portion of a link state protocol data unit (PDU) specifying link state information that describes links within the network, the fragment including a sequence number and a provided sequence number checksum; computing, by the first network device, and based on the sequence number, a sequence number checksum to obtain a computed sequence number checksum; determining, by the first network device, whether the computed sequence number checksum matches the provided sequence number checksum; and processing, by the first network device and based on the determination, the fragment to update a network topology maintained by the first network device.

In another example, a network device in a network having a topology of network devices includes control unit having processing circuitry operative to: receive, by a first network device residing in a network, from a second network device adjacent to the first network device in the network, and in accordance with a link state protocol, a fragment representative of at least a portion of a link state protocol data unit (PDU) specifying link state information that describes links within the network, the fragment including a sequence number and a provided sequence number checksum; compute, by the first network device, and based on the sequence number, a sequence number checksum to obtain a computed sequence number checksum; determine, by the first network device, whether the computed sequence number checksum matches the provided sequence number checksum; and process, by the first network device and based on the determination, the fragment to update a network topology maintained by the first network device.

In another example, a network comprising network devices connected according to a network topology: a first network device adjacent to a second network device, the first network device configured to: receive, from the second network device and in accordance with a link state protocol, a fragment representative of at least a portion of a link state protocol data unit (PDU) specifying link state information that describes links within the network, the fragment including a sequence number and a provided sequence number checksum; compute, by the first network device, and based on the sequence number, a sequence number checksum to obtain a computed sequence number checksum; determine, by the first network device, whether the computed sequence number checksum matches the provided sequence number checksum; and process, by the first network device and based on the determination, the fragment to update a network topology maintained by the first network device.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a block diagram illustrating a Link State Protocol (LSP) data unit for use in communications between network devices of an example network in accordance with the techniques of this disclosure.

Like reference characters refer to like elements throughout the figures and text.

DETAILED DESCRIPTION

Figure 1:
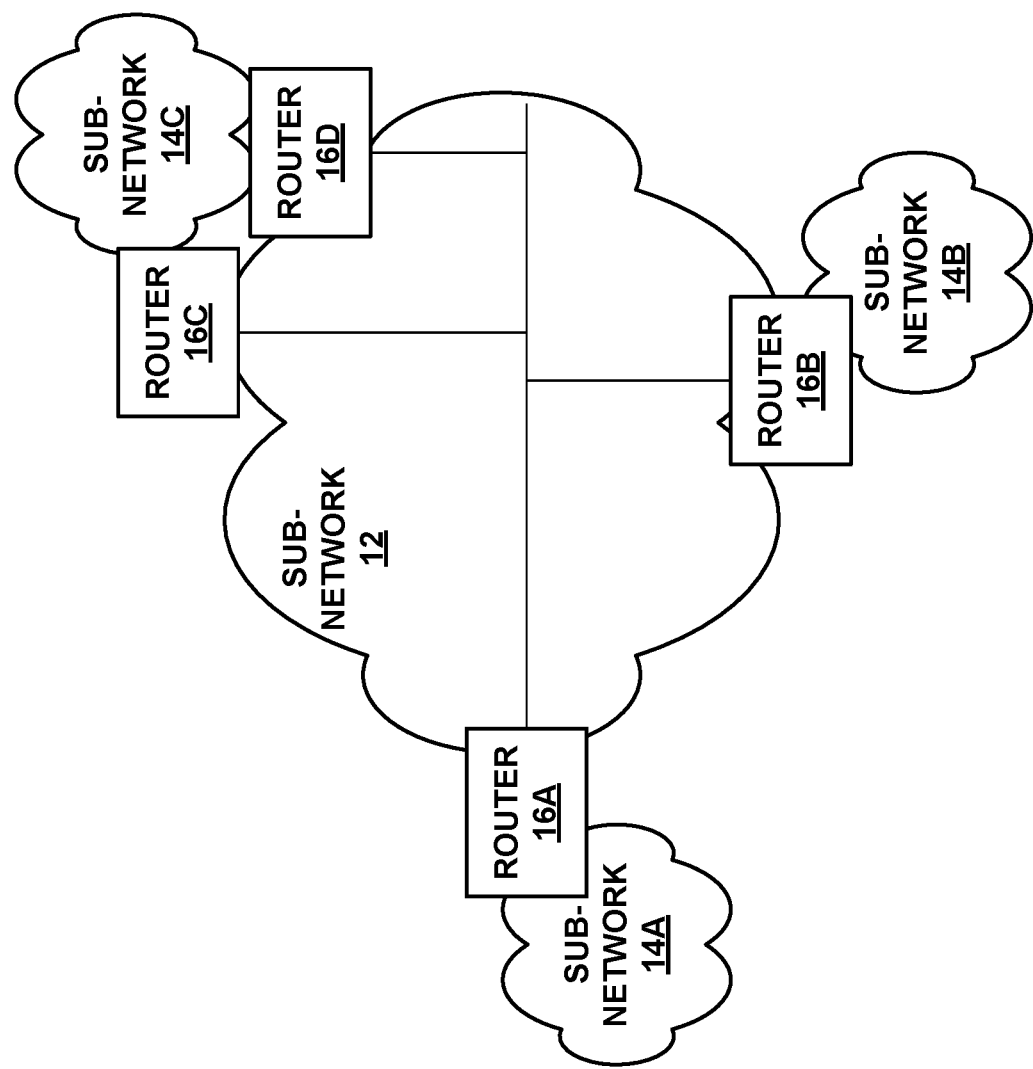
FIG. 1 is a block diagram illustrating a system that includes an example network having network devices configured to employ the techniques of this disclosure.

FIG. 1 is a block diagram illustrating an example network 10 that operates in accordance with various aspects of the techniques described in this disclosure. In the example of FIG. 1, network 10 includes a number of sub-networks, such as sub-networks 12 and sub-networks 14A-14C ("sub-networks 14") interconnected by routers 16A-16D ("routers 16"). In the example of FIG. 1, sub-network 12 represents a shared media access network. Moreover, sub-network 14C is communicatively coupled to sub-network 12 by both routers 16C and 1D and, therefore, may receive traffic from sub-network 12 via both of routers 16C and 16D.

In general, link state protocols, such as the Open Shortest Path First (OSPF) protocol, the Intermediate-System to Intermediate System (IS-IS) protocol, Routing Information Protocol (RIP), and Enhanced Interior Gateway Routing Protocol (EIGRP), allow the exchange of routing information for the purposes of identifying the topology of the example network 10.

In this example, routers 16 of network 10 implement one or more link state protocols to exchange routing information and facilitate forwarding of packets or other data units between endpoint devices throughout the network. While only sub-network 12 is illustrated as a shared media access network, each of sub-networks 14 may comprise a shared media access network or any other type of sub-network. In general, shared access sub-network 12 may be any form of shared access network, such as a broadcast or non-broadcast multi-access network (NBMA). As one example, shared access sub-network 12 may include an Ethernet network coupling routers 16.

Each of routers 16 operate in accordance with a link state protocol to exchange link state information (e.g., routing information). For example, routers 16 may execute the Open Shortest Path First (OSPF) routing protocol or the Intermediate system to intermediate system (IS-IS) routing protocol, each of which is an example of a link state protocol that uses link state information to convey available interfaces, metrics and other variables associated with network links via data units. OSPF utilizes data units referred to as Link State Advertisements (LSAs) while IS-IS uses data units referred to as Link State Protocol Data Units (PDUs) to exchange link state information.

Although referred to as PDUs throughout this disclosure, PDUs may describe a class of protocol data units that includes the particular type of PDU used to specify link state information, which is an LSP. As such, PDUs may also be denoted as LSPs, which is the notation used to refer to link state protocol data units (that advertise link state information) in request for comments (RFC) 1142, entitled "OSI IS-IS Intra-domain Routing Protocol," edited by D. Oran, and dated February 1990, the entire contents of which is hereby incorporated by reference as if set forth in its entirety. In addition, while various examples below are described in the context of IS-IS, the techniques described in this disclosure may be implemented with respect to any link state protocol, such as OSPF.

In general, routers 16 output PDUs specifying link state information to other routers within network 10. Based on the communicated link state information, routers 16 construct a graph or other data structure in a manner that reflects a topology of network 10. For example, routers 16 may form a graph data structure with each node of the graph representing a different one of routers 16 or a shared-access network and each edge interconnecting two nodes of the graph representing a different link between a corresponding two of routers 16, or between a router and a shared-access network.

Each edge of the graph may be associated with a cost or other edge value that reflects, advertised via the PDUs, link state information for each of the associated links. With IS-IS and other link state protocols, the edge between two router nodes has (potentially different) costs in both directions (e.g., from node 1 to node 2 and from node 2 to node 1), but the edge between a router node and shared-access network node typically only has cost for the router node to network node direction. Routers 16 may then implement a path selection algorithm to determine paths through the network for each source and destination of data packets. For example, routers 16 may implement a constrained shortest path first (CSPF) path selection algorithm to find lowest cost paths from each node to every other node.

After performing path selection, routers 16 forward packets in accordance with the selected paths. As network conditions change, such as when one of routers 16 becomes inoperable, a link goes down or becomes over consumed and slow, one or more of routers 16 may detect the change in network conditions, compute new cost metrics and output PDUs according to IS-IS that specify link state information defining the changing network conditions, thereby communicating the changes to the other ones of routers 16. Routers 16 process the PDUs of link state information to update their respective link state databases, and perform path selection based on an updated graph data structure to select new paths through network 10.

In large networks, there may be extensive changes that occur frequently, resulting in potentially large amounts of link state information. Routers 16 may, in other words, detect the changing network conditions, and generate PDUs specifying large amounts of link state information. Moreover, not all link state information in a given PDU may describe changing network conditions detected by a given one of routers 16 generating the PDU, considering that IS-IS (and other link state routing protocols) operates by "flooding" link state information throughout the network. Flooding refers to the process by which each of routers 16 receive PDUs via a given port and forward the PDU (which may be updated with link state information detected by the forwarding one of routers 16) via every other operating port of the forwarding one of routers 16. The PDU may then move throughout the entirety of network 12 to distribute or in other words "flood" the link state information within network 12.

Such flooding from router to router occurs as a result of IS-IS operating as a layer two (L2) (or, in other words, data-link layer) network protocol. In this respect, IS-IS does not support layer three functionalities for directed communication within the network that enables route-level forwarding of PDU. As such, routers 16 send PDUs as layer two data units, such as Ethernet frames or asynchronous transfer mode (ATM) cells, at a link-level from one of routers 16 to a directly adjacent one of routers 16 (which are directly connected to each other via a link). While, in smaller networks, the PDUs may adhere to limits of layer two networking protocols, such as a maximum transmission unit (MTU) size restriction of Ethernet, PDUs may exceed such limits in larger networks (particularly the MTU size restriction) having large amounts of link state information that is to be communicated between routers 16.

When the PDUs exceed the MTU of Ethernet or other size restrictions of other layer two network protocols, routers 16 may fragment the PDUs into two or more fragments, thereby partitioning link state information specified by the PDUs into different fragments. Fragmentation may, however, introduce churn in maintaining the link state databases within routers 16 that potentially may impair operation of network 12. For example, routers 16 may be unable to determine that a given fragment represents an entire PDU or one fragment of a number of fragments as IS-IS does not include any layer three network protocol mechanisms for handling layer two network protocol fragmentation.

As such, routers 16 may process the fragment as if the fragment represents the PDU in its entirety, processing incomplete link state information in a manner that results in improper updates to the representation of the network topology. Upon receiving a subsequent fragment for the PDU, routers 16 may then once again process the link state information specified in the subsequent fragment so as to potentially undo one or more of the updates to the representation of the network topology, thereby creating what is referred to as "churn" in which updates are performed only to be reversed or, in other words, undone.

To avoid churn, routers 16 may be configured to inject a delay with respect to processing of fragments so as to allow time to pass in an effort to ensure subsequent fragments will not undo updates resulting from currently received fragments. However, the injection of delay may result in delayed processing of link state information that in turn causes similar network inefficiencies, especially in a large network where link state information is exchanged at large scales as the delay may effectively prevent processing of link state information with sufficient timeliness to adequately keep up with the rate of changes in the network. The network inefficiencies may result in forwarding errors in which packets are forwarded along inefficient paths (having high cost metrics) while other paths having relatively low cost go largely unused, thereby resulting in dropped or delayed packet deliveries, violation of quality of service (QoS) agreements, etc.

Link state protocols avoid problems associated such instances by configuring router 16 with a shortest path first (SPF) delay and wait for all example data unit fragments to be received before SPF computations. The SPF delay essentially delays triggering an SPF computation for an arbitrary time period or until another (subsequent) fragment with a link state update is received. In practice, the SPF delay cannot be very high since it would slow down the convergence. Due to at least this limitation, configuring SPF delay cannot fully mitigate this problem in all situations.

Various embodiments in the present disclosure incorporate technology to maintain an accurate topology, particularly, in situations where processing data units of link state information causes errors and/or delays in transmission of packets between sub-networks. The present disclosure further includes a number of techniques employed by the various embodiments for avoiding or mitigating "churn" as described herein. At least one embodiment incorporates technology in the form of a link state protocol (e.g., IS-IS) configured to maintain a sequence number checksum. For example, routers 16 employing the sequence number checksum are now able to determine that a given fragment represents an entire PDU or one fragment of a number of fragments as IS-IS does not include any layer three network protocol mechanisms for handling layer two network protocol fragmentation. The techniques described herein may implement the sequence number checksum to identify instances where link state information has been moved into a different fragment or otherwise reshuffled amongst fragments. In large networks, movements of link state information amongst fragments occurs frequently. Such instances include creation of a new fragment to accommodate additional link state information into the example data unit as well as any of the above-mentioned situations.

However, the injection of delay may result in delayed processing of link state information that in turn causes similar network inefficiencies, especially in a large network where link state information is exchanged at large scales as the delay may effectively prevent processing of link state information with sufficient timeliness to adequately keep up with the rate of changes in the network.

Instead of an arbitrary and/or ineffective delay of SPF computations, at least one example technique of the present disclosure instructs router 16 to refrain from processing a current fragment and updating a topology for network 10 until reception of a next fragment of the example data unit. In some examples, the SPF computations may continue to facilitate the convergence. Router 16 may delay processing any link state information in the current fragment until a subsequent fragment of the example data unit is received. Some example techniques utilize the sequence number checksum to identify instances of "churn" and determine when to refrain from processing the current fragment in response to such instances.

For example, at least two routers (e.g., a sender network device and a downstream network device) of routers 16 exchange fragments, embedded in Ethernet frames or other L2 protocol units, of a current link state protocol data unit. In accordance with the techniques described herein, these fragments may include information regarding links between nodes as well as information regarding sequence numbers and sequence number checksums. The downstream network device of routers 16 may use this information to find lowest cost paths from that example router to every other network device in network 14 by applying a path section algorithm (e.g., SPF) to network 14's topology, calculate next-hops to be used to reach other routers 16 in network 14 based on the fragments and may install the calculated next-hops in stored forwarding information for forwarding network traffic destined for the other nodes. Routers 16 may delay such calculations in response to a mismatch between a stored sequence number checksum of the current link state protocol data unit and a sequence number checksum in a most recent Ethernet frame.

As described herein, IS-IS is a link-state protocol using Link State Protocol Data Units (PDUs) to advertise link state information amongst a network of network devices. IS-IS may, as noted above, be independent of layer 3 and use logical link control (LLC) encapsulation. As a result, each IS-IS PDU cannot exceed a maximum size restriction. For example, Ethernet-based networks impose a maximum PDU size of 1492 bytes. In some instances, an example network device may generate link state information for the PDUs in a Type-Length-Value (TLV) format. Link state information may be configured into a hierarchy where a parent TLV includes a number of sub-TLVs. Adding TLVs (e.g., sub-TLVs) into an example unfragmented PDU may cause a current iteration of the example PDU to exceed the maximum size restriction, resulting in fragmentation of that example PDU into at least two fragments.

In some examples, the above-mentioned sender network device of routers 16 may increment a sequence number for the example PDU, create two fragments with unique fragment identifiers (e.g., one-byte values, such as 0 or 1), and then, split all TLVs amongst these fragments. In another example, the example network device may store older TLVs into a first fragment and the additional TLVs into a second fragment. In yet another example, the example network device may move (e.g., reshuffle) older TLVs into the second fragment, providing space to store the additional TLVs in the first fragment.

In any of the above-mentioned examples, any downstream network device of routers 16 that receives only one fragment does not have the current iteration of the example PDU in entirety, resulting in missing link state information. To ensure that the downstream network device avoids the "churn" and/or maintains an accurate network topology, the downstream network device of routers 16, as dictated by the IS-IS protocol, is to refrain from processing any link state information in the received fragment. In some examples, the IS-IS protocol prescribes a delay in link state processing until a subsequent fragment having the missing link state information is received. In accordance with the prescribed delay, the downstream network device of routers 16 may delay performing shortest path first (SPF) computations including network measurements for updating the network topology with the fragment until the subsequent fragment is received.

The techniques described herein incorporate a sequence number checksum into a link state protocol, such as the IS-IS protocol, executed by at least the sender network device and the downstream network device of routers 16. In some examples, the sequence number checksum informs the IS-IS protocol of a recent fragmentation and/or reshuffling of link state information amongst fragments of a current iteration of an example PDU. In other examples, the sequence number checksum serves an indicator that missing link state information in one fragment may be found in a subsequent fragment (e.g., due to reshuffling). In some examples, the sequence number checksum is a multiple of the sequence number associated with fragments of the current iteration of the example PDU; hence, for n fragments of the example PDU having a sequence number i, the sequence number checksum may be computed as $n*i$. In this manner, the IS-IS protocol executed at the downstream network device of routers 16 may identify a fragment of the current iteration of the example PDU and determine whether a new fragment has been created. In other examples, the sequence number checksum may be a summation of sequence numbers associated with each iteration of the example PDU where an additional sequence number is added to the summation for each fragment; hence, for n fragments of the example PDU having a sequence number i, the sequence number checksum may be computed as $n*((i)(i+1)/2)$.

To illustrate by way of example, when the downstream network device of routers 16 receives an Ethernet frame, the IS-IS protocol identifies a fragment of the example PDU and extracts some information (e.g., attributes) from a header section. The IS-IS protocol observes an increment of a sequence number from a previous iteration of the example PDU, indicating an update to the link state information. Therefore, the received fragment of the example PDU belongs to a new iteration of the example PDU. The fragment of the example PDU may have been created prior to the current iteration or may be an entirely new fragment. The IS-IS protocol also observes a sequence number checksum and after comparing that sequence number checksum with an expected sequence number checksum, at least confirms if another fragment is expected to arrive at the downstream network device of routers 16. In some examples, based upon the comparison between the sequence number checksum and the expected sequence number checksum, the IS-IS protocol may determine whether a new fragment was recently created and/or whether the new fragment is expected in a subsequent frame transmission.

For example, if the example PDU was never fragmented in previous iterations and the new fragment was created to store additional link state information, the IS-IS protocol at the downstream network device may compute the expected sequence number checksum to be short by a sequence number for the new fragment after a comparison with the sequence number checksum in the received fragment. This deficiency indicates that the new fragment is scheduled to arrive at the downstream network device and that new fragment may store the missing link state information from the received fragment.

Figure 2:
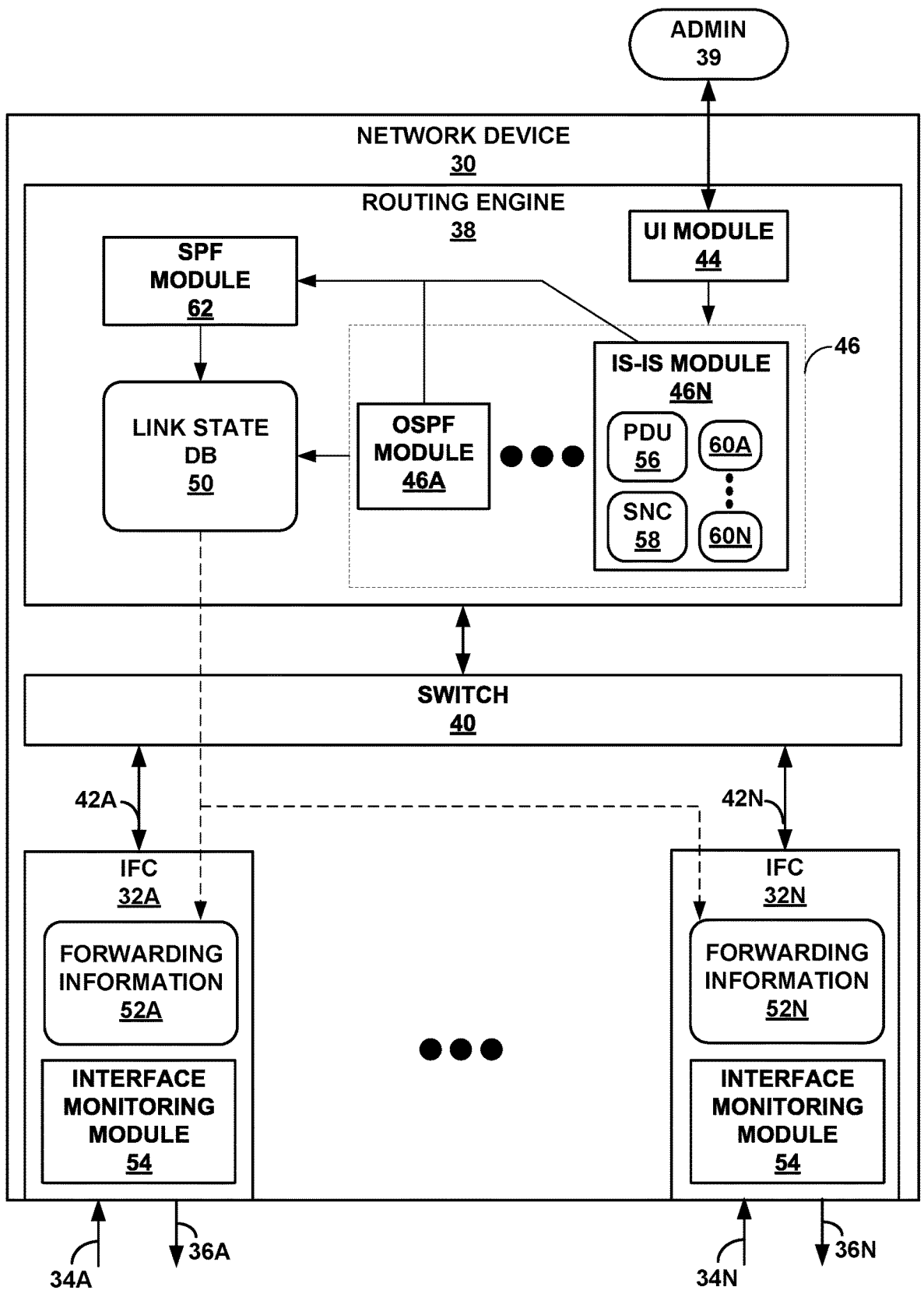
FIG. 2 is a block diagram illustrating a router as an example network device in an example network in accordance with the techniques of this disclosure.

FIG. 2 is a block diagram illustrating an exemplary network device 30 that performs various aspects of the techniques described in this disclosure. Network device 30 may represent one of routers 16 shown in the example of FIG. 1. While described with respect to network device 30, the techniques may be implemented by any other type of network device capable of implementing a link state protocol, such as the IS-IS routing protocol or the OSPF routing protocol. Thus, while described with respect to network device 30, the techniques should not be limited to exemplary network device 30 described with respect to the example of FIG. 2.

In the example of FIG. 2, network device 30 includes interface cards 32A-32N ("IFCs 32") that receive and send data units, such as packet flows, via network links 34A-34N and 36A-36N, respectively. Network device 30 may include a chassis (not shown) having a number of slots for receiving a set of cards, including IFCs 32. Each card may be inserted into a corresponding slot of the chassis for electrically coupling the card to control unit 38 via high-speed switch 40 and internal data paths 42A-42N ("internal data paths 42").

Switch 40 also provides an interconnect path between each of IFCs 32. Switch 40 may comprise, for example, switch fabric, switchgear, a configurable network switch or hub, or other high-speed switching mechanisms. Internal data paths 42 may comprise any form of communication paths, such as electrical paths within an integrated circuit, external data busses, optical links, network connections, wireless connections, or other communication paths. IFCs 32 may be coupled to network links 34A-34N and 36A-36N via a number of physical interface ports (not shown). Generally, IFCs 32 may each represent one or more network interfaces by which network device 30 may interface with links of a network, such as the links of sub-network 12 shown in the example of FIG. 1.

In general, control unit 38 for network device 30 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 38 may further include a non-transitory computer readable medium or other computer-readable storage device, which may include dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include or otherwise store instructions that, when executed, cause a programmable processor to perform the techniques described herein. These instructions may form a computer program, which may comprise software or other executable files.

Control unit 38 may further include a user interface (UI) module 44 ("UI module 44") and one or more link state protocol modules 46A-46N ("link state protocol modules 46"). UI module 44 may represent a module that presents a user interface with which an administrator or other user, such as administrator 39 ("admin 39"), may interact to configure one or more of link state protocol modules 46, as well as, control unit 38 generally. Link state protocol modules 46 may, as shown in the example of FIG. 2, include an OSPF module 46A, an IS-IS module 46N and any other link state protocol.

IS-IS module 46N represents a module that implements the IS-IS routing protocol in accordance with the IS-IS RFC 1142, by D. Oran, entitled "OSI IS-IS Intra-domain Routing Protocol," dated February 1990, which is hereby incorporated by reference in its entirety.

Control unit 38 may further include and maintain link state database 50 that stores LSAs and any other information or data used to identify or otherwise determine the network topology. Link state protocol modules 46 may update link state database 50 or otherwise store data specifying the links of the network, including characteristics concerning these links, such as various costs and other metrics. Control unit 38 may maintain link state database 50 in the form of one or more tables, databases, link lists, radix trees, databases, flat files, graphs or any other data structure. Based on link state database 50, control unit 38 generates forwarding information 52A-52N ("forwarding information 52") for IFCs 32.

Each of the IFCs 32 includes a forwarding component (not shown) that forwards packets in accordance with forwarding information 52 generated by control unit 38. Specifically, the forwarding components of IFCs 32 determine a next hop for each inbound IP packet (which may be differentiated from MPLS packets in that these IP packets do not include a label stack) based on forwarding information 52, identify the corresponding one of IFCs 32 associated with the next hop, and relay the packets to the appropriate one of IFCs 32 via switch 40 and corresponding ones of data paths 42. While described above as discrete modules 44-48, the modules may be combined to form a single module or unit or may be implemented separately as distinct hardware or software units. Reference to individual modules is not meant to reflect actual discrete implementations and more than one module may be implemented by the same hardware or combination of hardware or software.

Initially, admin 39 may interface with a user interface, such as a command line interface (CLI) or graphical-user interface (GUI), presented by UI module 44 to configure one or more of link state protocol modules 46. For example, admin 39 may interface with a user interface to indicate that IS-IS module 46N is to use the techniques provided in accordance with this disclosure in maintaining an accurate link-state in the network. After configuring one or more of protocols 46, admin 39 may also interface with a user interface to input link data associating one or more links. UI module 44 may store this link data to link state database 50 as a new entry or may update link state database 50 based on the input link data to reflect the new link state information defined by this link data for the corresponding links.

After configuring control unit 38 in this manner, admin 39 may then activate or otherwise enable network device 30 to begin processing packets, such as standard IP packets that are forwarded in accordance with forwarding information 52. Prior to receiving these packets, one of more of modules 46 may generate PDU 56 that includes a link similar to Link Type 2 in the context of IS-IS. The new type indicates that sub-network 12 is using a sequence number checksum (SNC) 58 defined in accordance with various aspects of the techniques described in this disclosure. Moreover, PDU 56 may include more links as with the conventional link state protocol.

As described herein, the SNC 58 refers to a checksum value that is computed from a set of sequence numbers associated with fragments 60A-60N ("fragments 60"). Each fragment of fragments 60 includes a portion of advertised link state information in accordance with a link state protocol, such as IS-IS protocol 46N. The advertised link state information and other information is maintained in link state database 50. Each portion of that advertised link state information may be represented in link state database 50 by a fragment sequence number. In one example, IS-IS module 46N assigns sequence numbers to fragments 60A-N and then, generates SNC 58 from those sequence numbers. When preparing header information for fragments, IS-IS module 46N inserts SNC 58 as an attribute into each fragment's header structure. It is appreciated that SNC 58 may be in a Type-Length-Value format or in another format. As an alternative or in addition to the above operation, IS-IS module 46N may insert SNC 58 into each fragment as a Type-Length-Value (TLV) data set. By inserting SNC 58 into each of fragments 60A-N and then, propagating fragments 60A-N through example network 10, IS-IS module 46N ensures access to SNC 58 by any receiving network device. Therefore, techniques of the present disclosure enable receiving network devices to identify a reshuffling of fragments and avoid effects from that reshuffling.

In some examples, when received at the receiving network device (e.g., a router similar to network device 30), a counterpart IS-IS module on that device reads SNC 58 from a fragment's header and determines whether a reshuffling occurred based upon an examination of SNC 58. In one example, the receiving network device determines that a reshuffling occurred when SNC 58 does not match a counterpart SNC computed from a local link state database at the receiving network device. If there is such a mismatch, the receiving network device imposes a delay on processing the fragment. The imposed delay, in effect, also delays updating the local link state database and any subsequent network measurements including SPF computations by SPF module 62.

According to examples where network device 30 receives a fragment from a sender network device, IS-IS module 46N operates in a manner similar to the above-mentioned counterpart IS-IS module. In one example, IS-IS module 46N proceeds to read header information from the fragment's header structure and extract the fragment's sequence number checksum from that header information. IS-IS module 46N compares the fragment's sequence number checksum with SNC 58 and if IS-IS module 46N determines a mismatch, IS-IS module 46N institutes a delay to further processing and updating link state database 50. In response to a subsequent fragment having missing TLV data to complete the reshuffling, IS-IS module 46N removes the delay and continues updating link state database 50.

In response to updating link state database 50, one of link state protocol modules 46 may invoke SPF module 62, which resolves its corresponding portion of link state database 50 to generate forwarding information 52. The one of link state protocol modules 46 may then configure or otherwise update IFCs 32 with the newly resolved forwarding information 52. IFCs 32 may continue to receive and forward IP packets in accordance with forwarding information 52.

While forwarding packets, one or more of IFCs 32 may invoke or otherwise execute interface monitoring module 54. Interface monitoring module 54 may represent a module that monitors interfaces of IFC 32A to identify change of communication capability via each of the links (often, by measuring bandwidth). When the change exceeds a threshold, as one example, interface monitoring module 54 may interface with one or more of link state protocol modules 46 to indicate or otherwise specify that a particular link has a degradation of communication beyond the threshold degradation. The one or more of link state protocol modules 46 may then generate a router PDU 56 indicating that the cost metric to network device 30 from sub-network 12 has changed (and possibly that the cost metric from network device 30 to sub-network 12 has changed) for the identified link.

FIG. 3 illustrates an example fragment 110 configured to maintain an accurate link-state in the network 10 for a link state protocol (LSP). The example fragment 110 is at least a portion of a Link State Protocol Data Unit (PDU) employed by a network device for advertising link state information in accordance with IS-IS. The network device may be one of the routers 16 (e.g., the router 16A) in one of the sub-networks 14 (e.g., the sub-network 14A). The PDU refers to a total link state information available in the network 10. Another fragment of the PDU may be configured to advertise a different portion of the total link state information. Example fragment 110 may be embedded into an Ethernet frame as what is known as a link state protocol (LSP) packet. For OPSF, information stored in the fragment 110 can be adapted into a Link State Advertisement (LSA).

The example fragment 110 includes a number of attributes of which FIG. 3 depicts a specific configuration; it is appreciated that other configurations in the IS-IS protocol may employ different sets of attributes where some are similar and others are different from the number of attributes depicted in FIG. 3. Example fragment 110 includes header 112 having, as attributes, an intra domain routing protocol discriminator 114A, a PDU maximum size 114B, a PDU identifier (i.e., LSP ID) 114C, ID length 114D, and a sequence number 114E. Example fragment 110 further includes an arrangement of TLV data sets in payload 126; and, as illustrated in FIG. 3, TLV data sets 116-125 are stored in payload 126. In accordance with techniques described herein, one of these TLV data sets stores a sequence number checksum (SNC). As illustrated in FIG. 3, TLV data set 125 stores SNC type 125A. SNC length 125B, and SNC value 125C. SNC type 125A indicates that the SNC is stored in SNC value 125C and SNC length 125B indicates a length of the SNC stored in SNC value 125C. In some examples, IS-IS module 46N of the network device computes the SNC value 125C as a multiple of sequence number 114E by a total number of fragments of the PDU. It is appreciated that sequence number 144E is different from a fragment identifier which is stored in PDU identifier 114C (e.g., in a last byte).

As described for FIG. 3, the payload 126 of the fragment 110 advertises, in TLV data set 125, a sequence number checksum value for a current iteration of the PDU at the network device. An example Sequence Number Checksum (SNC) may be a four (4) byte long numerical value, which may be a multiple or a summation of sequence numbers of all fragments in the PDU at the network device. Whenever the network device sends a fragment of the PDU, the IS-IS module 46N of the receiving device computes an expected sequence number checksum value from sequence numbers of all fragments in the PDU. If there is a mismatch between the expected sequence number checksum value and the sequence number checksum snc1 provided by the network device, a new fragment of the PDU was created.

As described herein, the TLV data sets illustrated in FIG. 3 may be hierarchical in structure where a parent TLV data set is related to a number of sub-TLV data sets. The parent TLV data set typically stores some type of link state information, such as link information or prefix information, for the routers 16 in a number sub-TLVs. Over time, it may be necessary to introduce an additional sub-TLV data set into the parent TLV data set. As mentioned herein, due to the fragmentation of link state protocol data units and size restrictions affecting fragments of these data units, there may be instances where adding the sub-TLV data set to a current fragment storing the parent TLV is not possible without moving the parent TLV data set into a fragment with sufficient free space.

In an example, the TLV data set 116 (hereinafter labelled "T1") may be advertised initially in the payload 126 of the example fragment 110 (hereinafter labelled "F1") having sequence number 114E (hereinafter labelled "f1s1") and SNC value 125C (hereinafter labelled "snc1"). If the PDU includes only F1 and another fragment (hereinafter labelled "F2") currently having a sequence number (hereinafter labelled "f2s1"), IS-IS module 46N computes snc1 as a summation of sequence numbers f1s1 and f2s1. The network device transmitting PDU fragments executes a reshuffling process that updates fragments F1 and F2's sequence numbers to f1s2 and f2s2, respectively, and then, floods these packets across the network. After adding more information to F1, the IS-IS module 46N in the network device moves the data set T1 into other fragment F2 in the PDU, incrementing sequence number 114E from f1s1 to f1s2.

Prior to transmission of a new fragment F1, a link state database in a receiving device (i.e., a second network device in the network 10) includes information from previous fragment F1 having a sequence number f1s1. The receiving device receives the new fragment F1 in an updated example fragment 110 having the updated sequence number f1s2. The IS-IS module 46N of the receiving device proceeds to update the link state database with new link state information. It should be noted that the new fragment F1 does not include the TLV data set T1 for that data set is now in fragment F2. After the update, the link state database includes fragment F1 having sequence number f1 s2 and an old fragment F2 having sequence number f2s1. It should be further noted that the link state database does not include a new fragment F2 having sequence number f2s2 and storing the updated TLV data set T1. Thus, the IS-IS module 46N of the receiving device computes an expected sequence number checksum from sequence number f1 s2 of new fragment F1 and sequence number f2s1 of the old fragment F2. In contrast, the IS-IS module 46N in the network device provides, in the new fragment F1, a second sequence number checksum computed from sequence number f1s2 of new fragment F1 and sequence number f2s2 of the new fragment F2. In response, the IS-IS module 46N may direct the receiving device to refrain from processing, based on the determination that the computed sequence number checksum does not match the provided sequence number checksum, the new fragment F1's link state information.

Eventually, the receiving device will receive the new F2 fragment as well; in the meantime, the receiving device may misinterpret the reshuffling of fragments as the TLV data set T1 in the fragment F1 being removed by the parent node. If the TLV data set T1 included link information, the receiving device may misinterpret the reshuffling as the link being down. To prevent/mitigate any problems that could occur during the duration of time when the receiving device has only the new fragment F1 and the old fragment F2, the receiving device executes one or more techniques provided herein. In one example, the receiving device avoids problems by delaying performing shortest path first (SPF) computations and updating a network topology.

With respect the above-mentioned example, the second sequence number checksum (hereinafter labelled "snc2") may be a checksum value calculated from a first sequence number f1s2 and a second sequence number f2s2. The network device communicates to the receiving device a new data unit (e.g., packet) with the new fragment F1 having the first sequence number f1s2 and sequence number checksum snc2, and (in another data unit) the new fragment F2 having the second sequence number f2s2 and sequence number checksum snc2. If the receiving device receives the new fragment F1 before the new fragment' F2, the receiving device detects an update to the link state information by identifying the sequence number checksum snc2 in the new fragment F1. The receiving device calculates the checksum from sequence numbers of the first network device's fragments that available in the receiving device's database and determines if there is a mismatch with the new fragment F1. If this checksum value does not equal snc2, the receiving device determines that the new fragment F2 has not been received yet. Because the checksum from f1s2 and f2s1 is not equal to snc2, the receiving device will delay processing the new fragment 110 and triggering the SPF. When the new fragment F2 is received, the receiving device will be able to match F2's Sequence Number Checksum of snc2 with a checksum computed from all fragments. Once there is a match, the receiving device will proceed with processing both data units and will trigger an SPF for the same if required.

Figure 4:
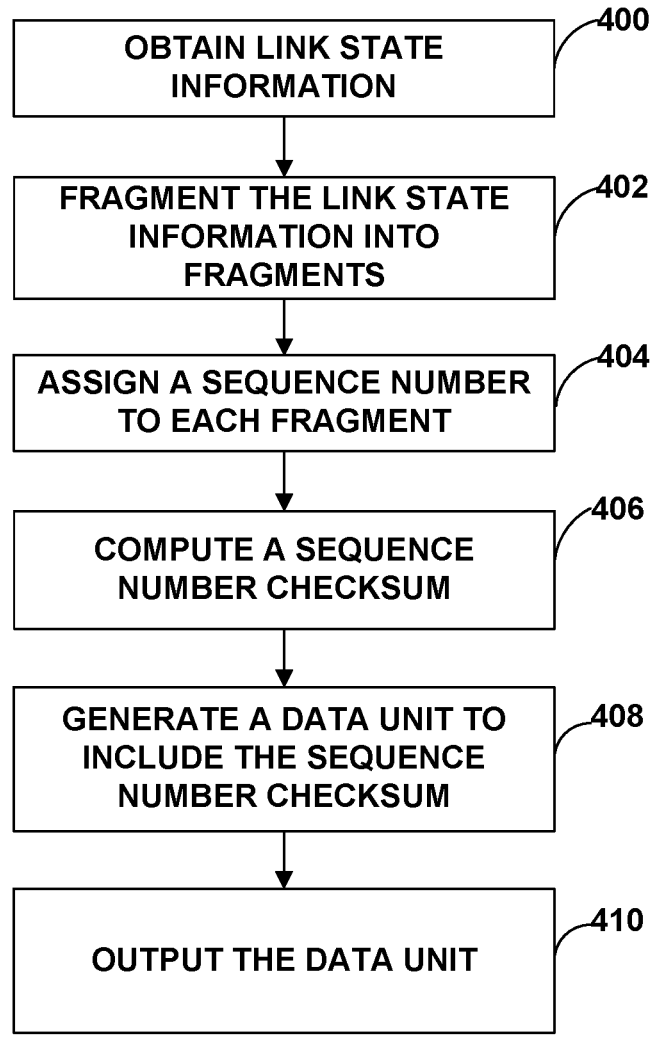
FIG. 4 is a flow diagram illustrating a process that includes example operations performed by example network device in example network in accordance with one or more aspects of the present disclosure.

FIG. 4 is a flow diagram illustrating example operations performed by example network device in example network 10 in accordance with one or more aspects of the present disclosure. FIG. 4 is described herein within the context of network device 30 of FIG. 2 as the example network device. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, network device 30 maintains an accurate link state in example network 10 while avoiding "churns" and other defects caused by reshuffling of link state information (e.g., TLV data sets) amongst fragments of a link state protocol data unit (PDU). Network device 30 obtains link state information for the PDU (400) in link state database 50. As described herein, IS-IS module 46N includes logic operative on processing circuitry to fragment into at least two fragments a current iteration of the link state information being stored in link state database 50 (402), assign a sequence number to each fragment (404), and compute a sequence number checksum using the fragments' sequence numbers (406). IS-IS module 46N generates a data unit (e.g., packets) to include the sequence number checksum (408) and one of the fragments. Network device 30 outputs the data unit to other network devices in example network 10 (410).

Figure 5:
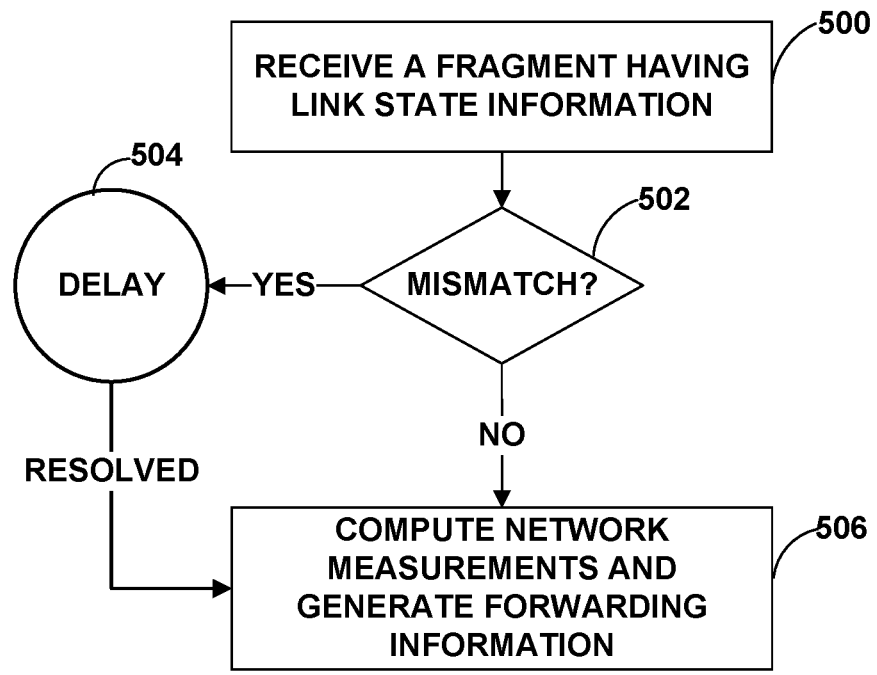
FIG. 5 is a second flow diagram illustrating a process that includes example operations performed by an example network device in an example network in accordance with one or more aspects of the present disclosure.

FIG. 5 is a second flow diagram illustrating example operations performed by example network device in example network 10 in accordance with one or more aspects of the present disclosure. FIG. 5 is described herein within the context of network device 30 of FIG. 2 as the example network device. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, an example network floods its network devices with current link state information in Ethernet frames having, in their payloads, fragments of the Link State Protocol data unit (PDU). Each fragment includes link state information in one or more TLV data sets. Each network device in example network 10 maintains a database comprising a current iteration of a PDU comprising link state information extracted from TLV data sets in the fragments as explained herein. An example data unit with TLV data sets is illustrated in FIG. 3.

Having the database to maintain a current state of the link state information, network device 30 is able to compute an expected sequence number checksum value. One characteristic of the sequence number checksum attribute is to verify how many fragments are in the PDU. Another characteristic is to indicate a recent reshuffling of link state information amongst fragments in the link state protocol being employed in example network 10. The sequence number checksum attribute, as another characteristic, independently verifies that the recent reshuffling did not result from a network change nor did it cause a network change. As described herein, network changes include removals of network devices from example network 10; and incorrect information about such removals results in errors in at least the forwarding information. Previously, missing TLV data from a fragment resulted in an incorrect assumption that example network 10 dropped a network device associated with the missing TLV data. However, by examining the sequence number checksum, the network device 30 may eliminate or mitigate errors caused by the faulty assumption of a network change.

In one example, network device 30 receives, from a second network device adjacent to the network device 30 in example network 10, a fragment having updated link state information and performs the following before updating the above-mentioned database with the updated link state information. As described herein, a fragment is representative of at least a portion of the PDU specifying the link state information that describes links within example network 10. The fragment includes a sequence number and a sequence number checksum. In one example, network device 30 computes a checksum value from sequence numbers of received fragments of the current PDU. In another example, network device 30 examines previous PDUs (e.g., a previous PDU from a same sender network device) and computes a sequence number checksum from the one or more fragments in those PDUs.

Network device 30 proceeds to compare the provided sequence number checksum attribute from the received fragment with the expected sequence number checksum value that is computed from previous link state information and determine whether there is a mismatch (502). If there is a mismatch between the sequence number checksum attribute and an expected checksum value, network device 30 refrains from or otherwise delays processing the fragment in the data unit until a subsequent data unit arrives (504). If the subsequent data unit arrives without a fragment having an updated sequence number, the subsequent data unit indicates that any link described in the missing TLV data sets are now unavailable. In one example, updated link state information may arrive at network device 30 in the form of a new fragment with an incremented or updated sequence number. After re-computing the expected sequence number checksum from previous sequence numbers and the incremented or updated sequence number, the network device 30 compares the expected sequence number checksum with the sequence number checksum in the subsequent data unit to resolve the mismatch. When the mismatch is resolved, network device 30 computes network measurements and generates forwarding information from SPF computations (506).

Figure 6:
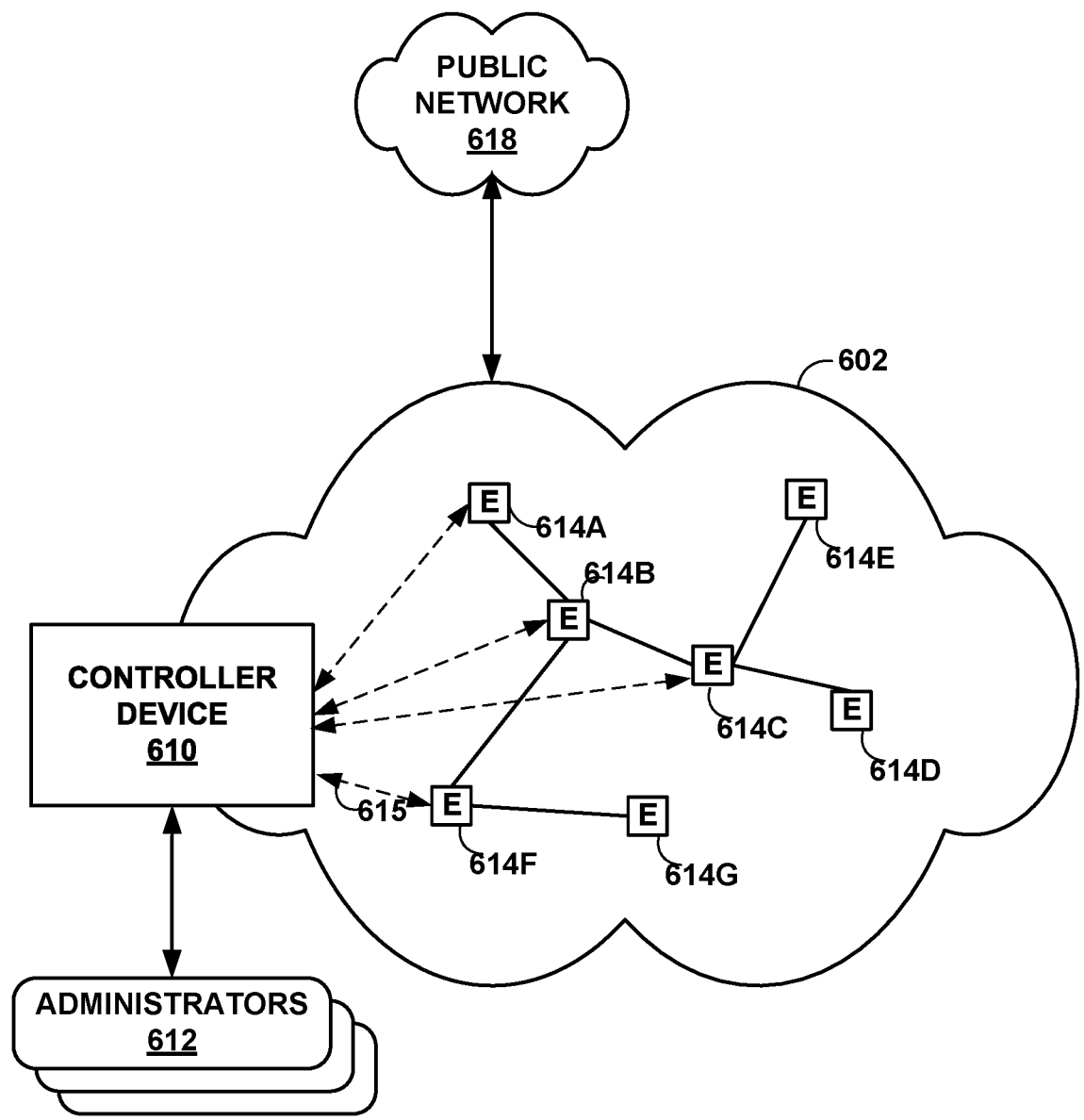
FIG. 6 is a block diagram illustrating an example controller device in an example network in accordance with one or more aspects of the present disclosure.

FIG. 6 is a block diagram illustrating an example enterprise network 602 having elements that are managed using a controller device 610.

Controller device 610 may include multiple network interfaces in various examples, although only one network interface is illustrated for purposes of example. One network interface may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols).

As described herein, there are a number of situations (besides exceeding the maximum size restriction) where network device 30 moves or reshuffles link state information amongst fragments of an example data unit. There may be instances where a configuration change results in an update of more than one fragment of the example data unit. Example configuration changes may occur when adding admin-groups to multiple interfaces, adding multiple prefixes, etc. Any of these situations could potentially cause traffic drops or unnecessary traffic rerouting. This could negatively impact controller device 610 if that controller device 610 is relying upon an external database for routing decisions. In such a situation, controller device 610 could end up re-routing a huge number of tunnels even though there was no real network change.

If controller device 610 is directly listening to ISIS link state protocol updates, controller device 610 could use the same logic to wait for all updated fragments to be received before acting on the update. If controller device 610 is notified via a different protocol (say BGP-LS), the IGP implementation would inform this protocol only once it has received all the relevant fragments as per sequence number checksum.

Managed elements 614A-14G (collectively, "elements 614") of enterprise network 602 include network devices interconnected via communication links to form a communication topology in order to exchange resources and information. Elements 614 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 602 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 614 may be physical links (e.g., optical, copper, and the like), wireless, or any combination thereof.

Enterprise network 602 is shown coupled to public network 618 (e.g., the Internet) via a communication link. Public network 618 may include, for example, one or more client computing devices. Public network 618 may provide access to web servers, application servers, public databases, media servers, end-user devices, and other types of network resource devices and content.

Controller device 610 is communicatively coupled to elements 614 via enterprise network 602. Controller device 610, in some examples, forms part of a device management system, although only one device of the device management system is illustrated for purpose of example in FIG. 1. Controller device 610 may be coupled either directly or indirectly to the various elements 614. Once elements 614 are deployed and activated, administrators 612 uses controller device 610 (or multiple such management devices) to manage the network devices using a device management protocol. One example device protocol is the Simple Network Management Protocol (SNMP) that allows controller device 610 to traverse and modify management information bases (MIBs) that store configuration data within each of managed elements 614. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. As another example, Network Configuration Protocol (NETCONF) provides mechanisms for configuring network devices and uses an Extensible Markup Language (WL)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference.

Controller device 610 may also referred to as a network management system (NMS), NMS device, element management system (EMS), or EMS device. Elements 614 are centrally maintained by an IT group of the enterprise. Administrators 612 interacts with controller device 610 to remotely monitor and configure elements 614. For example, administrators 612 may receive alerts from controller device 610 regarding any of elements 614, view configuration data of elements 614, modify the configurations data of elements 614, add new network devices to enterprise network 602, remove existing network devices from enterprise network 602, or otherwise manipulate the enterprise network 602 and network devices therein. Although described with respect to an enterprise network, the techniques of this disclosure are applicable to other network types, public and private, including LANs, VLANs, VPNs, and the like.

In some examples, administrators 612 uses controller device 610 or a local workstation to interact directly with elements 614, e.g., through telnet, secure shell (SSH), or other such communication sessions. That is, elements 614 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 614, e.g., element 614F, using controller device 610, to directly configure element 614F. In this manner, a user can provide commands in a format for execution directly to elements 614.

Further, administrators 612 can also create scripts that can be submitted by controller device 610 to any or all of elements 614. For example, in addition to a CLI interface, elements 614 also provide interfaces for receiving scripts that specify the commands in accordance with a scripting language. In a sense, the scripts may be output by controller device 610 to automatically invoke corresponding remote procedure calls (RPCs) on the managed elements 614. The scripts may conform to, e.g., extensible markup language (XML) or another data description language.

Administrators 612 uses controller device 610 to configure elements 614 to specify certain operational characteristics that further the objectives of administrators 612. For example, administrators 612 may specify for an element 614 a particular operational policy regarding security, device accessibility, traffic engineering, quality of service (QoS), network address translation (NAT), packet filtering, packet forwarding, rate limiting, or other policies. Controller device 610 uses one or more network management protocols designed for management of configuration data within managed network elements 614, such as the SNMP protocol, NETCONF protocol, or a derivative thereof, such as the Juniper Device Management Interface, to perform the configuration. Controller device 610 may establish NETCONF sessions with one or more of elements 614.

Controller device 610, in accordance with at least one technique described herein, maintains an accurate topology of at least some elements of elements 614 of enterprise network 602. Similar to routers 16 of example network 10 of FIG. 1 and network device 30 of FIG. 2, controller device 610 supports fragmentation capabilities of a link state protocol (e.g., IS-IS protocol) in effect at enterprise network 602. In some examples, controller device 610, executing the IS-IS protocol, introduces a sequence number checksum into each fragment of a link state protocol data unit (PDU) having a current iteration of link state information. The sequence number checksum enables identification, by a receiver network device of enterprise network 602, of instances of fragmentation, for example, when a new fragment has been created. The techniques may also be performed by Managed Network Service (MNS) devices or other types of controllers.

In some example embodiment, a method includes steps of: obtaining, by a first network device of a network and according to a link state protocol, link state information identifying a status of a link between the first network device and a second network device; fragmenting, by the first network device, the link state information into a plurality of fragments; assigning, by the first network device, a sequence number from a plurality of sequence numbers to each of the fragments; computing, by the first network device and based on the plurality of sequence numbers, a sequence number checksum; updating, by the first network device, each of the fragments to include the sequence number checksum; and outputting, by the first network device, the fragments.

In one example, the link state protocol of the methods disclosed herein may include an Intermediate-System to Intermediate-System (IS-IS) protocol and a link state protocol data unit (PDU) that specifies, in accordance with the IS-IS protocol, the link state information. In one example, each fragment of the methods disclosed herein comprises the sequence number checksum as an attribute. In one example of the methods disclosed herein, the step of updating each of the fragments to include the sequence number checksum includes adding, to each of the fragments, a type-length-value (TLV) field having a value sub-field that specifies the sequence number checksum.

In one example of the methods disclosed herein, the step of computing, by the first network device and based on the plurality of sequence numbers, the sequence number checksum further includes computing, by the first network device, the sequence number checksum in response to a reshuffling of the link state information among the fragments.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a non-statutory computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The invention claimed is:

1. A method comprising:
receiving, by a first network device residing in a network, from a second network device adjacent to the first network device in the network, and in accordance with a link state protocol, a fragment of a plurality of fragments of which each fragment is representative of a portion of a link state protocol data unit (PDU) specifying link state information that describes links within the network, the fragment including a sequence number and a provided sequence number checksum computed from sequence numbers of the plurality of fragments;
computing, by the first network device, and based on the sequence number, a sequence number checksum to obtain a computed sequence number checksum for all fragments of the link state PDU;
determining, by the first network device, whether the computed sequence number checksum matches the provided sequence number checksum; and
processing, by the first network device and based on the determination, the fragment to update a network topology maintained by the first network device.

2. The method of claim 1, wherein processing the fragment includes processing the fragment based on the determination that the computed sequence number checksum matches the provided sequence number checksum.

3. The method of claim 1, wherein processing the fragment includes refraining from processing the fragment based on the determination that the computed sequence number checksum does not match the provided sequence number checksum.

4. The method of claim 1 further comprising delaying, by the first network device, performing shortest path first (SPF) computations.

5. The method of claim 1 further comprising delaying, by the first network device, network measurements for updating the network topology with the fragment until another fragment is received.

6. The method of claim 5, wherein the other fragment comprises link state information for the second network device in at least one Type-Length-Value (TLV) data set, wherein the other fragment further comprises the sequence number and the sequence number checksum.

7. The method of claim 6, wherein the sequence number checksum is a multiple of the sequence number.

8. The method of claim 1 further comprising receiving, at the first network device, a second fragment from the second network device, the second fragment comprising another portion of the link state protocol data unit (PDU) specifying the link state information, the second fragment further comprising a second sequence number and a second sequence number checksum.

9. The method of claim 8, wherein the second sequence number checksum is computed as a summation of the sequence number and the second sequence number.

10. The method of claim 1, wherein the second network device creates a new fragment to store the portion of the PDU specifying the link state information in response to adding new link state information to the fragment of the PDU.

11. A network device in a network having a topology of network devices:
control unit comprising processing circuitry operative to:

receive, by a first network device residing in a network, from a second network device adjacent to the first network device in the network, and in accordance with a link state protocol, a fragment of a plurality of fragments of which each fragment is representative of a portion of a link state protocol data unit (PDU) specifying link state information that describes links within the network, the fragment including a sequence number and a provided sequence number checksum computed from sequence numbers of the plurality of fragments;

compute, by the first network device, and based on the sequence number, a sequence number checksum to obtain a computed sequence number checksum for all fragments of the link state PDU;

determine, by the first network device, whether the computed sequence number checksum matches the provided sequence number checksum; and process, by the first network device and based on the determination, the fragment to update a network topology maintained by the first network device.

12. The network device of claim 11, wherein the control unit comprises processing circuitry operative to: process the fragment based on the determination that the computed sequence number checksum matches the provided sequence number checksum.

13. The network device of claim 11, wherein the control unit comprises processing circuitry operative to: refrain from processing the fragment based on the determination that the computed sequence number checksum does not match the provided sequence number checksum.

14. The network device of claim 11, wherein the second network device creates a new fragment to store the portion of the PDU specifying the link state information in response to adding new link state information to the fragment of the PDU.

15. The network device of claim 11, wherein the control unit comprises processing circuitry operative to: extract the sequence number checksum as an attribute from header information or from a TLV data set of the fragment.

16. A network comprising network devices connected according to a network topology:

a first network device adjacent to a second network device, the first network device configured to:
  receive, from the second network device and in accordance with a link state protocol, a fragment of a plurality of fragments of which each fragment is representative of a portion of a link state protocol data unit (PDU) specifying link state information that describes links within the network, the fragment including a sequence number and a provided sequence number checksum computed from sequence numbers of the plurality of fragments;
  compute, by the first network device, and based on the sequence number, a sequence number checksum to obtain a computed sequence number checksum for all fragments of the link state PDU;
  determine, by the first network device, whether the computed sequence number checksum matches the provided sequence number checksum; and
  process, by the first network device and based on the determination, the fragment to update a network topology maintained by the first network device.

17. The network of claim 16, wherein the first network device is configured to: process the fragment based on the determination that the computed sequence number checksum matches the provided sequence number checksum.

18. The network of claim 16, wherein the first network device is configured to: refrain from processing the fragment based on the determination that the computed sequence number checksum does not match the provided sequence number checksum.

19. The network of claim 16, wherein the second network device creates a new fragment to store the portion of the PDU specifying the link state information in response to adding new link state information to the fragment of the PDU.

20. The network of claim 16, wherein the first network device is configured to: update the network topology with the fragment in response to receiving another fragment, wherein the other fragment further comprises the sequence number and the sequence number checksum, the sequence number checksum being a multiple of the sequence number.

* * * * *